United States Patent
Conley et al.

[11] Patent Number: 5,154,396
[45] Date of Patent: Oct. 13, 1992

[54] REINFORCED PLASTIC VALVE

[75] Inventors: Richard W. Conley; Richard P. Tremblay, both of Pittsburgh; James R. Daniels, McDonald; Sam A. Brunetto, Jr., Pittsburgh, all of Pa.

[73] Assignee: Kerotest Manufacturing Corp., Pittsburgh, Pa.

[21] Appl. No.: 735,098

[22] Filed: Jul. 23, 1991

Related U.S. Application Data

[60] Division of Ser. No. 575,591, Aug. 31, 1990, abandoned, which is a continuation-in-part of Ser. No. 483,924, Feb. 23, 1990, Pat. No. 4,988,077, and a continuation of Ser. No. 308,787, Feb. 8, 1989, abandoned, and a continuation of Ser. No. 873,712, Jun. 12, 1986, abandoned, and a continuation of Ser. No. 740,228, Jun. 3, 1985, abandoned.

[51] Int. Cl.$^5$ ............................................. F16K 5/04
[52] U.S. Cl. ................................. 251/309; 137/68.1
[58] Field of Search ........................ 251/309; 137/68.1

[56] References Cited

U.S. PATENT DOCUMENTS

| | | | |
|---|---|---|---|
| 2,390,026 | 11/1945 | Hosking | 152/430 |
| 2,903,236 | 9/1959 | Holycross | 251/366 |
| 2,994,504 | 8/1961 | Reed | 251/312 |
| 3,185,179 | 5/1965 | Harautunien | 251/309 X |
| 3,276,739 | 10/1966 | Freed | 251/314 |
| 3,314,644 | 4/1964 | Dwyer . | |
| 3,526,386 | 9/1970 | Gachot | 251/358 X |
| 3,656,711 | 4/1972 | Toelke | 251/151 |
| 3,825,030 | 7/1974 | Kalsi | 137/375 |
| 3,857,546 | 12/1974 | Quirk | 251/315 |
| 4,171,711 | 10/1979 | Babe et al. | 251/309 X |
| 4,478,388 | 10/1984 | George | 251/309 |
| 4,494,730 | 1/1985 | George | 251/309 |
| 4,988,077 | 1/1991 | Conley et al. | 251/309 |

FOREIGN PATENT DOCUMENTS

| | | |
|---|---|---|
| 0635934 | 2/1963 | Belgium . |
| 0032038 | 3/1984 | European Pat. Off. . |
| 1555545 | 6/1967 | France . |

Primary Examiner—John C. Fox
Attorney, Agent, or Firm—Stanley J. Price, Jr.

[57] ABSTRACT

A polyethylene plastic valve has a molded cylindrical body portion with an internal chamber with inlet and outlet openings. A unitary plastic plug member is rotatably positioned in the chamber. The plug member has an actuator portion formed of impact resistant plastic material, and a plug portion formed of dimensionally rigid plastic material with a flow passage therethrough. The plug member has open and closed positions. Dual durometer valve seats are positioned on the plug member to close the inlet and outlet openings in the valve body. The actuator portion of the plug member extends upwardly through the chamber and seals the internal chamber at the top by means of a circumferentially extending flange portion. A bottom cover plate is fused to and seals the lower end of the internal chamber. The bottom cover is arranged to disengage from the valve body and relieve excess pressure build up in the lower end of the chamber. The valve body is molded around a cylindrical metal reinforcing member having openings aligned with inlet and outlet openings in the valve body and has a plurality of other apertures which permit the plastic of the valve body to flow therethrough and connect the plastic on opposite sides of the reinforcing member.

4 Claims, 6 Drawing Sheets

REINFORCED PLASTIC VALVE

CROSS REFERENCE TO RELATED APPLICATIONS

This application is a division of copending application Ser. No. 575,591 filed Aug. 31, 1990 now abandoned which is a continuation-in-part of Ser. No. 308,787 filed Feb. 23, 1990, now U.S. Pat. No. 4,988,077, a continuation of application Ser. No. 308,787 filed on Feb. 8, 1989, now abandoned, a continuation of Ser. No. 873,712 filed on Jun. 12, 1986, now abandoned and a continuation of Ser. No. 740,228 filed on Jun. 3, 1985, entitled "Reinforced Plastic Valve" now abandonded.

BACKGROUND OF THE INVENTION

1. Field of the Invention

This invention relates to a reinforced plastic valve and, more specifically, to a polyethylene plastic valve which has anti-creep properties and is capable of operating at higher pressure ratings for an extended period of time.

2. Description of the Prior Art

Plastic valves, such as those disclosed in U.S. Pat. Nos. 4,014,513; 4,171,711; 4,234,011; and 4,488,741, have recently been satisfactorily and successfully employed for the flow control of numerous types of fluids in various piping systems and in a wide range of environmental conditions. However, because of the nature of plastic, there have heretofore been some limitations on the amount of fluid pressure which should be allowed in systems which employ plastic valves. For example, it has been found that, when various plastic valves have been utilized in systems which have a relatively high operating pressure, after an extended period of time, the valve plug and/or valve body can experience "creep" which alters the design dimensions of the valve and/or plug to decrease its overall efficiency and reliability.

"Creep" can be defined as progressive strain without increased stress. If one is free to select alternative materials of construction, it is possible to eliminate any real concern for "creep". However, there are instances where the plastic body material must be identical to that of the piping system. For example, if the body is to be fused to the pipes in the system, the same material is required for a proper union. The piping could display high "creep" characteristics and still be reliable while the same "creep" in the body could alter its dimensions and reduce the reliability of sealing around the plug which prevents leakage and sealing at the valve seat which controls flow through the valve.

Although not specifically related to the type of valve of the present invention, U.S. Pat. No. 3,092,365 discloses a rubber plug for a valve which is basically formed around and reinforced by an internal metal structure. Other types of valves have employed inserts in various types of closure members and in various areas of the valve body to generally solve different problems than that of "creep" as described hereinabove. For example, U.S. Pat. No. 3,133,722 discloses a sleeve liner which can be made of plastic material but is intended to serve as a backing material for a tapered plug member which is primarily intended to function as the closure device for the valve. U.S. Pat. No. 4,303,223 discloses valve facing strips of a fire hydrant valve which are primarily intended to provide a reliable, low friction working surface for the axial movement of the valve disclosed therein.

Additional patents disclose some form of sleeve or reinforcing element which are not primarily intended to strengthen the valve body but are instead intended to insure proper sealing of the valve during closure. For example, U.S. Pat. No. 3,061,269 discloses an internal sleeve which can be made of numerous types of material but is primarily intended to provide a surface having a low-coefficient of friction for the rotation of the valve closure member disclosed therein. Similarly, U.S. Pat. Nos. 3,244,389 and 3,398,925 disclose ball valves which have annular reinforcing means at the edge seals thereof to insure that proper sealing is maintained against the surface of the ball to prevent the loss of fluid from the flow passages thereof.

U.S. Pat. No. 3,091,428 discloses a metallic ball valve and U.S. Pat. Nos. 3,192,945 and 3,913,610 disclose metallic butterfly valves which are primarily intended for use in metal piping systems. The ball valve of U.S. Pat. No. 3,091,428 includes a central cylindrical ring section which primarily supports the ball and to which identical cups are joined to form the composite valve. Similarly, the butterfly valves of U.S. Pat. Nos. 3,192,945 and 3,913,610 disclose cylindrical metallic sleeves or body portions which primarily rotatably support the butterfly closure members thereof. These valves include the provision of a lining or interior coating for the cylindrical metallic portion which is formed of resilient rubber-like, plastic, or synthetic material to provide the sleeve with erosion and/or corrosion protection.

More significantly, U.S. Pat. No. 4,348,006 discloses a butterfly-type valve having a plastic body portion with a valve seat formed by a metal sleeve molded within and sealed to the plastic valve body portion with an annular rubber sleeve insert vulcanized to the metal sleeve. The metal sleeve is intended to prevent migration or "creep" of the elastomeric insert but an additional sealing means between the metal sleeve and the plastic body portions is employed to insure that there will be no fluid leakage therebetween.

Finally, although not intended to reinforce the valve body thereof or to qualify the valve for use with fluids operating at higher pressures, U.S. Pat. No. 3,526,386 discloses a plastic valve having a metallic sleeve which is inserted in and embedded within the flow line thereof. The sleeve is said to "reinforce" the flow line but is primarily utilized to provide a stronger, reinforced coupling means for installing the plastic valve within a piping system.

U.S. Pat. No. 4,171,711 also discloses a bottom cap member to permit leakage if the fluid pressure within the valve body increases above a given amount. U.S. Pat. No. 4,171,711 also discloses valve seats positioned with the cylindrical plug with key portions as guides for the seal.

U.S. Pat. No. 4,511,120 discloses a rotary plug type plastic service valve that has a unitary plug and actuator member where the actuator portion of the valve has a flange portion so that impact forces applied to the actuator are transmitted away from the stem and plug portions and distributed throughout the valve body.

Consequently, there remains a need for providing a plastic valve which includes means for insuring that the valve can be satisfactorily employed in fluid systems of higher pressure without any detriment thereto over an extended period of time.

SUMMARY OF THE INVENTION

In accordance with the present invention, there is provided a reinforced plastic valve including a generally cylindrical body portion at least partially formed of a molded plastic material preferrably polyethylene and having an axially extending interior chamber. A pair of flow lines intersect the body portion and the interior chamber thereof. A flow isolation member or actuator-plug assembly is mounted in the chamber and is selectively movable to control the flow of fluid through the flow lines. The body portion includes reinforcing means formed of a reinforcing material stronger than the molded plastic material and is embedded within said molded plastic material and surrounds the interior chamber.

Also in accordance with the present invention, there is provided a reinforced plastic valve body structure of molded polyethylene including a generally cylindrical body formed of a molded plastic material and having an axially extending interior chamber which is capable of receiving a movable flow isolation member therein. A pair of flow lines intersect the body and the body includes reinforcing means formed of a reinforcing material stronger than the molded plastic material embedded within the molded plastic material and surround the chamber.

Further in accordance with the present invention, there is provided a method of forming a generally cylindrical valve body including the steps of forming a sleeve of reinforcing material into a generally cylindrical shape. The sleeve is installed within a valve body mold. Plastic material such as polyethylene is injected into the mold to surround the sleeve. The molded plastic material is permitted to set to retain the sleeve with the valve body.

Further in accordance with the present invention, there is provided a plug-actuator member with the actuator member formed from a high impact resistant plastic and the plug member formed from a different plastic that is creep resistant. The plug member during molding is integrally formed with the preshaped plastic actuator.

Also, in accordance with the present invention the valve plug member includes valve seats with backing members having a greater durometer hardness then the valve seat. There is also provided a means to permit the escape of fluid from the valve body chamber by lightly fusing a cap member to the circumferential bottom edge of the valve body.

Accordingly, it is an object of the present invention to provide a valve which includes a plastic valve body which is reinforced to allow the valve to be utilized in fluid systems of higher pressure for an extended period of time without any loss of reliablity thereof.

A further object is to provide a valve where the body can be formed of a particular plastic material which is identical to that which is considered appropriate for the piping system to enable the body to be properly fused to the pipe.

It is another object of the invention to provide a method of forming such a valve by installing a sleeve of reinforcing material embedded within the plastic material of the body thereof.

These and other objects of the present invention will be more completely disclosed and described in the following specification, the accompanying drawings, and the appended claims.

DESCRIPTION OF THE PREFERRED EMBODIMENTS EMBODIMENT ILLUSTRATED IN FIGS. 1-6

Figure 1:
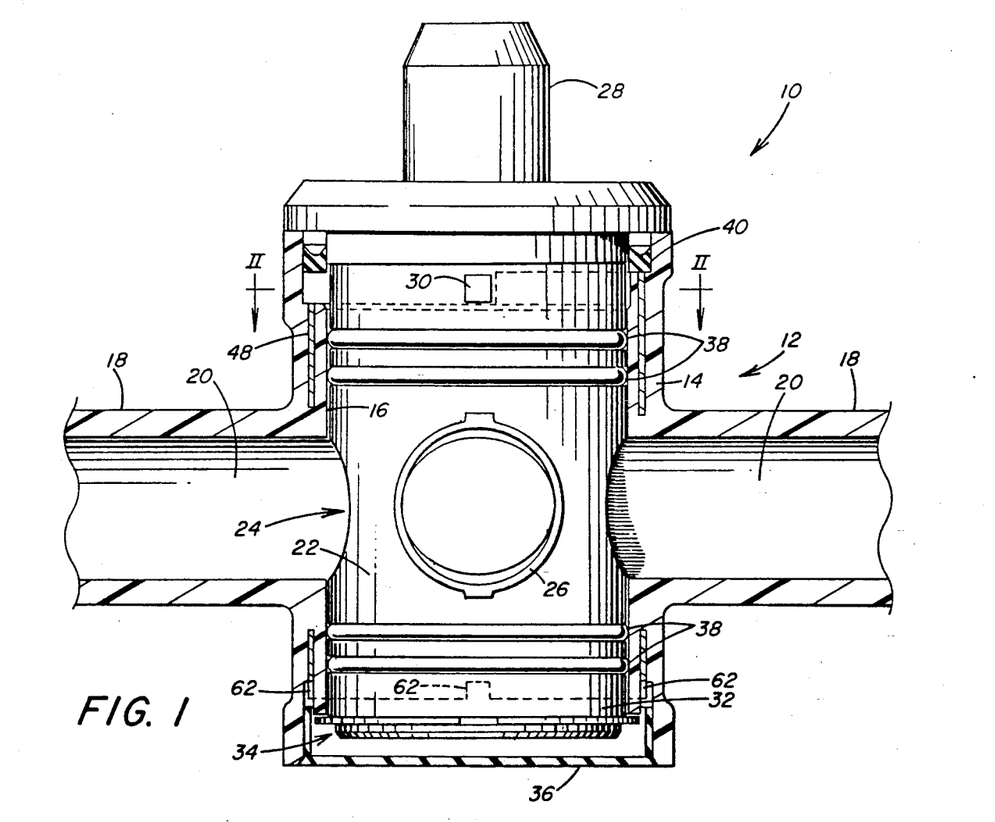
FIG. 1 is an elevational view partially in section of a valve including various features of the invention.

As seen in FIG. 1, a valve 10 is primarily formed of molded plastic and includes a valve body structure 12 having a generally cylindrical body 14 with an axially extending interior chamber 16. A pair of flow lines 18 of the body structure 12 are preferably integrally formed with and intersect the body 14 and include flow passages 20 thereof which intersect the chamber 16. A rotatable flow isolation member in the form of a plug 22 is mounted within the chamber 16 to be capable of being selectively positioned to allow or prevent flow through the flow passages 20.

Specifically, as seen in FIG. 1, the plug 22 includes a transverse opening 24 therethrough to allow flow through the flow passages 20 and opposing seats 26 which can be aligned with the passages 20 when the plug 22 is rotated to prevent the flow of liquid therethrough. The plug 22 includes a handle 28 and at least one radially extending rotational stop element 30 which will be discussed in detail hereinbelow. Further, the lower end 32 of the plug 22 includes a groove and retaining means 34 for preventing withdrawal of the plug 22 from the chamber 16 after it has been installed within the body portion 14. A sealed bottom 36 is added to the body portion 14 after installation of the plug 22 therein to prevent dirt or ice from forming at the bottom of the valve 10 and interfering with the rotation of the plug 22. The plug 22 is provided a plurality of O-ring seals 38 to primarily retain fluid within the flow passages 20 and the transverse opening 24 of the plug 22 and prevent leakage at the top or bottom of the plug 22 during normal use of the valve 10. A sealing ring 40 is also provided to the top of the valve 10 to prevent the ingress of fluid or contaminates into the chamber 16 around the top of the plug 22. If "creep" were allowed to occur to the body 14, proper sealing contact between the O-ring seals 38 and seats 26 and the chamber 16 could not be maintained and leakage through the valve 10 and to the atmosphere could occur.

Figure 2:
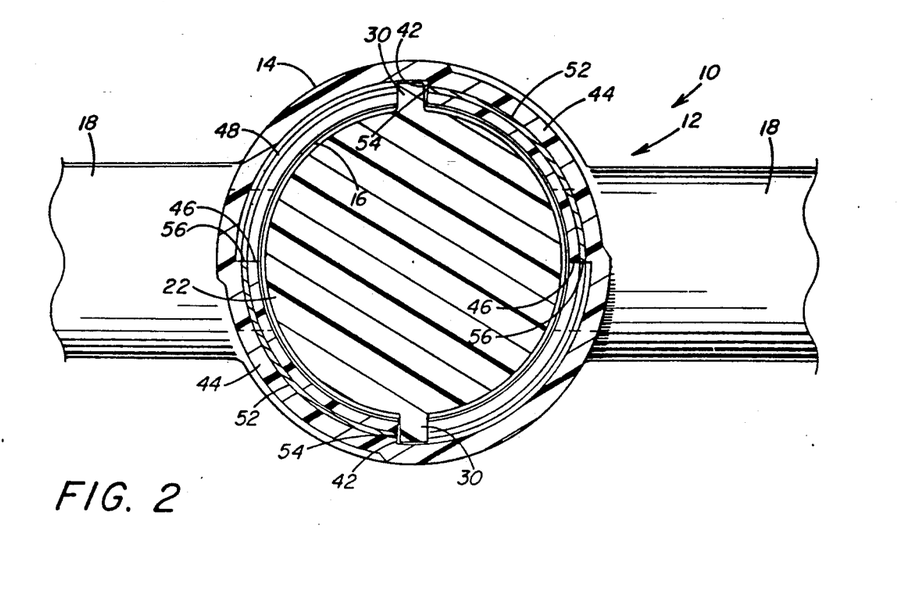
FIG. 2 is a view of the valve as seen along line 2—2 in FIG. 1.

As seen in FIG. 2, the plug 22 includes two radially extending rotational stop elements 30 which are shown in a position for allowing flow through the valve 10. The rotational stop elements 30 are prevented from rotation in a clockwise direction by respective abutting contact with the ends 42 of a pair of axially extending sectors 44 of the body 14. Rotation of the plug 22 in a counter-clockwise direction would cause the rotational stop elements 30 to make contact with the other ends 46 of the axially extending sectors 44 of the body 14 to ensure that the seats 26 are properly aligned with the flow passages 20 when the valve 10 is closed. It should be noted that each of the sectors 44 extends less than 90° to accommodate for the thickness of the stop elements 30 while allowing a full 90° rotation of the plug 22. Clearly, the sectors 44 and stop elements 30 might be oriented to any circumferential location around the plug 22 and body 14 as long as the opening 24 and seats 26 will be properly alignable with the flow passages 20. It would also be obvious to alter the valve 10 to include only one stop element and one sector of approximately 270° for similar limitations on the rotation of the plug.

As thus described, the valve is similar to the valve disclosed in U.S. Pat. Nos. 4,014,513; 4,171,711; 4,324,011; and 4,488,741. Although the valves disclosed therein have been satisfactorily employed, the valve 10 includes features which could accommodate a higher pressure rating while being formed of a plastic material which is identical to that selected for the piping system in which it is to be employed. As mentioned hereinabove it has been found that when polyethylene plastic valves are subjected to higher operating pressures over an extended period of time, the body can experience "creep" where the design dimensions tend to change to interfere with the overall integrity of the plug as installed in the valve body and reduce the efficiency of the sealing of the valve. Accordingly, the valve 10 includes a preferred body 14 which includes reinforcing means formed of a reinforcing material which is stronger than the molded plastic material.

Figures 3, 4, 5:
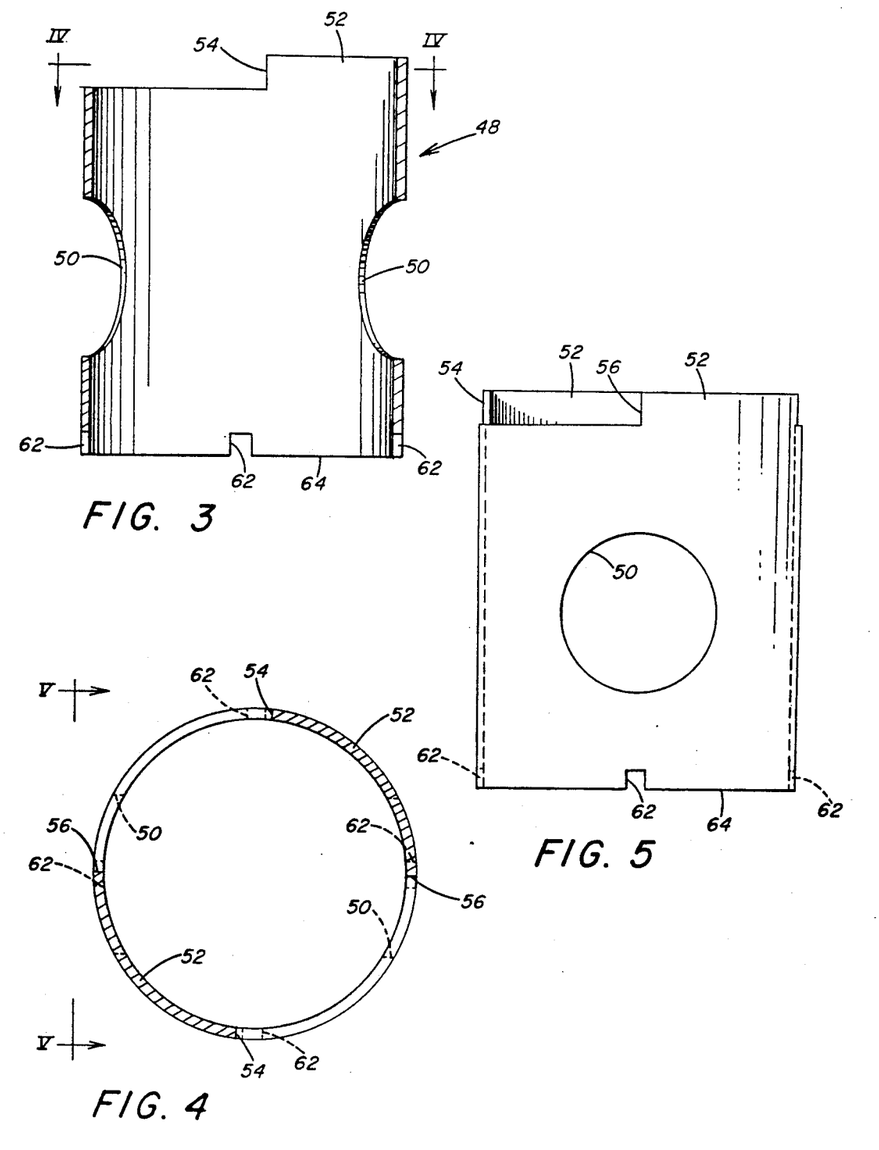
FIG. 3 is a sectional view of the reinforcing sleeve oriented in a manner similar to its orientation in FIG. 1.
FIG. 4 is a view of the sleeve seen along line 4—4 of FIG. 3.
FIG. 5 is an view in elevation of the sleeve as seen along line 5—5 of FIG. 4.

The preferred reinforcing means is in the form of a sleeve 48 which extends around the body 14. As best seen in FIGS. 3, 4, 5, the sleeve 48 is formed of metal and is generally cylindrical to completely encircle the body 14. A pair of openings 50 are formed through the sleeve 48 and are to be aligned with the flow passages 20 of the flow lines 18.

Additionally, it will be noted that the sleeve 48 includes axially extending portions 52 at the upper end thereof which portions 52 will lie within the pair of axially extending sectors 44 of the body portion 14. As a result, the axially extending portions 52 each include ends 54 which are aligned with the ends 42 of the sectors 44 and ends 56 which are aligned with the ends 46 of the sectors 44. As a result, with the sleeve 48 properly embedded within the body 14, the sleeve 48 will tend to reinforce the body 14 and further ensure that there is adequate strength in the axially extending sectors 44 for properly serving as a means to limit rotation of the plug 22 throughout the life of the valve 10. In fact, it is significant that the sectors 44 be sufficiently stronger than the stop elements 30 to ensure that the stop elements 30 will be cleanly severed from the plug 22 if one tries to force the rotation of the plug 22 by the sectors 44. It is better for the stop elements 30 to be cleanly removed than to allow forced rotation of the plug 22 to result in its being directly damaged in a manner which would interfere with its ability to selectively control flow through the valve.

As shown in FIGS. 1 through 5, it should be clear that the sleeve 48 is at least partially encased within the plastic material of the body 14. In other words, the sleeve 48 will properly add reinforcement to the body 14 but will not generally be exposed to the environment or to the fluid within the flow passages 20 or the interior chamber 16. Since it is not exposed to the fluid in the valve 10, there is no need to be concerned with any leakage around the sleeve 48 which might otherwise occur. Further, since the preferred reinforcing sleeve 48 does not extend to the interior surface of the interior chamber 16, the preferred plug 22 will rotate and provide sealing as if it were installed within an entirely plastic body 14.

As thus described, it is expected that the reinforcing sleeve 48 will prevent creep which may otherwise have existed in the major body portion 14. It is also expected that the sleeve 48 will be properly retained within the major body portion 14 by the encasement of the sleeve 48 within the plastic material of the major body portion 14. However, should there turn out to be some localized movement of the plastic material of the major body portion 14, it is possible to provide rounded edges for the openings 50 to ensure that no cracks or other failure of the plastic material develops at the edges of the holes 50. Additionally, although the sleeve 48 should remain in place since it is encased in the molded plastic material, an alternative configuration could include a plurality of radially extending holes at various locations around the sleeve 48 to cause the plastic material to flow therethrough when the body 14 is being formed by molding. Since the plastic material may not directly adhere to the metal of the sleeve 48, the additional holes would further ensure that there is a complete encasement of the sleeve 48 within the plastic material. With the plastic material extending through such a plurality of holes in the sleeve 48, the sleeve 48 would be further secured within the body 14 to resist any rotational forces created by the stop elements 30 during rotation of the plug 22.

Figure 6:
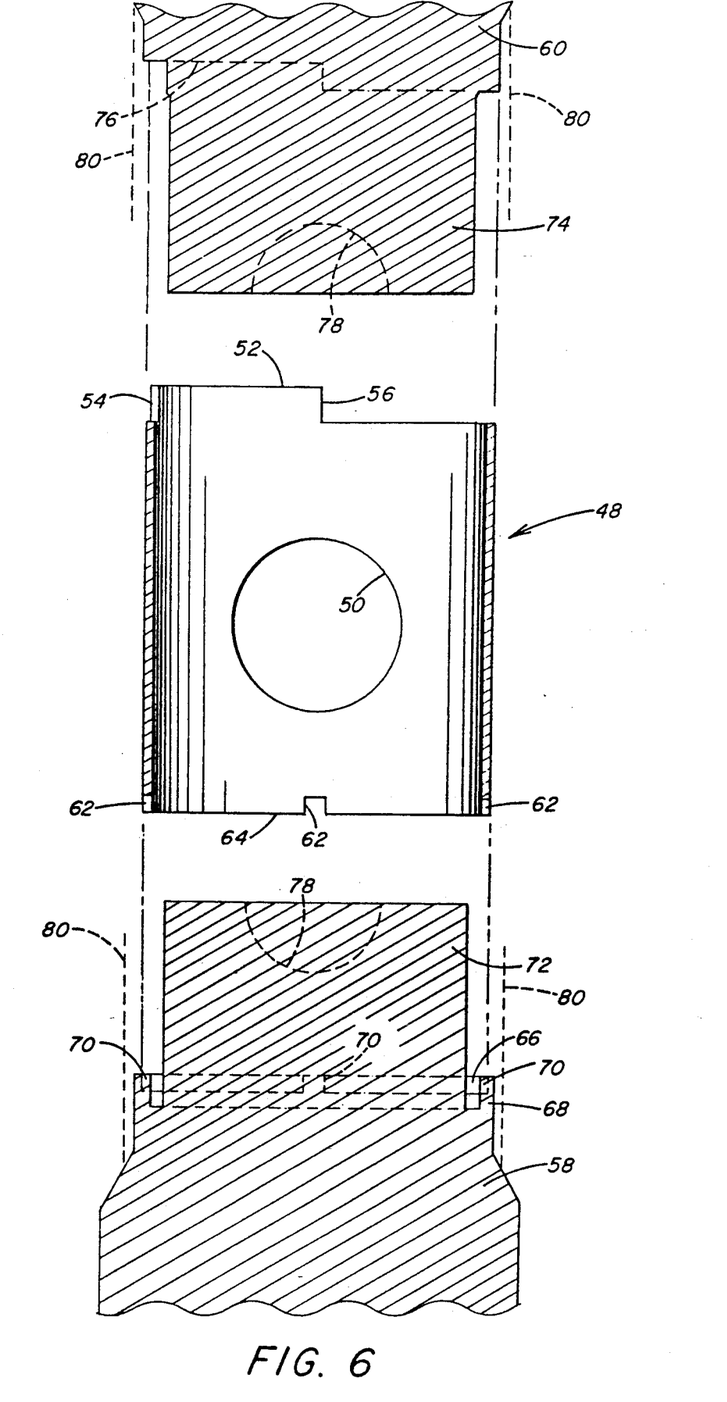
FIG. 6 is an exploded view partially in section of the sleeve including its method of formation within a plastic valve body mold.

To provide the valve 10 with the included reinforcing sleeve 48, the method of forming the valve body structure 12 includes means for ensuring that the sleeve 48 is properly supported and oriented during the plastic valve molding process. Specifically, as seen in FIG. 6, a bottom core 58 and a top core 60 of the basic valve body mold are utilized to properly support and orient the preferred sleeve 48. Additional portions of the valve body structure mold have been eliminated from FIG. 6 in order to be able to properly demonstrate those portions which are essential to an understanding of the overall method of forming the valve body structure 12. For example, the valve body mold preferably includes a pair of passage cores for forming the flow passages 20 which passage cores intersect with and join the bottom core 58 and top core 60.

Lastly, the valve body mold primarily includes an external mold which is formed of two halves for the formation of the exterior of the valve body 12. It should be understood that the injection molding of plastic material of the type used to form the preferred valve body 12 is well known in the art. For example, if one were to provide any of the plastic valves mentioned as the prior art hereinabove, it would be quite common to inject plastic material into a valve body mold of the general type described and to allow the plastic material to set prior to disassembly of the mold and removal of the cores therefrom.

However, in order to specifically support and orient the sleeve 48, the preferred sleeve 48 includes four evenly-spaced notches 62 in the lower edge surface 64 thereof. The bottom core 58 includes a shoulder 66 on an upwardly extending cylindrical portion 68 thereof for receipt of the lower edge surface 64 of the sleeve 48 thereon. The shoulder 66 has four evenly-spaced tabs 70 which are alignable with the notches 62 for respectively receiving them thereon. Consequently, with the sleeve 48 installed in the cylindrical portion 68 of the bottom core 58, the sleeve 48 is concentrically positioned on the core 58 and separated from a center portion 72 thereof which is intended to partially form the interior chamber 16. Further, because of the orientation of the notches 62 and the tabs 70, the sleeve 48 can be positioned on the bottom core 58 with the openings 50 properly aligned for the formation of the flow lines 18.

Once the sleeve 48 is properly supported by the bottom core 58, the top core 60 can be joined to the bottom core 58 as the center portion 74 thereof combines with the center portion 72 of the bottom core 58 to complete the form needed for the interior chamber 16. The top core 60 includes circumferential recessed portions 76 for receipt of the axially extending portions 52 of the sleeve 48 for the eventual formation of the axially extending sectors 44 of the body 14.

After the bottom core 58 and the top core 60 are joined in this manner with the sleeve 48 properly positioned therebetween, the openings 50 of the sleeve 48 are aligned with a pair of cavities 78 at opposite sides of the combined center portions 72, 74. The cavities 78 are intended to receive the interior end of the passage cores mentioned hereinabove. It should be clear that the passage cores could be formed as a single long core extending through the bottom core 58 and the top core 60 so that the cavities 78 would alternatively extend all the way therethrough. In either case, sleeve 48 is aligned with the passage cores to allow the formation of the flow passages 20 of the flow lines 18. When the exterior halves of the valve body mold are fully installed, as generally represented by the dotted lines 80 to show their relationship to the cores 58, 60, the exterior walls of the body 14 will be forced with an outside diameter larger than the exterior diameter of the sleeve 48. Accordingly, sufficient plastic material will be formed around the exterior of the sleeve 48 to primarily encase the sleeve 48 within the preferred body 14. Since the passage core and the exterior halves of the valve body mold does not make any contact with the sleeve 48, the sleeve 48 is surrounded by the plastic material at all locations other than those where there is direct contact with the cores 58, 60. Consequently, the sleeve 48 is located radially within the cylindrical wall of the body 14 to include the plastic material internally and externally thereof.

It should be clear that, after the entire valve body mold is assembled, plastic material can be injected into the mold to at least partially surround the sleeve 48. After the molded plastic material has been allowed to set and the exterior mold and interior cores are removed, the sleeve 48 will be retained within the molded valve body structures 12.

Although the sleeve 48 is primarily intended to reinforce the body 14 throughout use of the valve 10, it is possible that the sleeve 48 may provide an added benefit during formation of the body 14. It has been found that when a body without an encased sleeve has been molded in the manner generally described hereinabove, it is not uncommon for the body to be slightly warped upon removal from the mold with the chamber thereof not having a truly cylindrical shape. As a result, the chamber 16 must be machined to provide the required shape for proper receipt of a plug 22 therein. The sleeve 48 being employed in the method of formation of the body 14 as described above could completely eliminate this required step and should, at the least, reduce the amount of machining that may be required. Further, if there is no need for such machining, it has been found that the interior surface of the chamber 16 as formed by the body mold has excellent characteristics for direct installation of the plug 22 therein.

Further, it would clearly be possible for various alterations to be made to the preferred embodiment described hereinabove without departing from the scope of the invention as claimed. For example, it might be advantageous to include only one notch 62 at a lower edge surface 64 of the sleeve 48 to mate with only one tab 70 on the bottom core 58 to ensure that there is only one possible orientation of the sleeve 48 relative to the bottom core 58. Additionally, although the "bottom core" 58 was used to primarily support the sleeve 48 during the formation of the preferred valve body structure 12, it would be possible for either a bottom core or a top core to be properly configured for this purpose while still falling within the scope of the invention as claimed.

Although the method of providing the valve body structure 12 is expected to properly encase the sleeve 48 within the molded plastic material, it should be recognized that the bottom core or the top core could be slightly altered to further surround the end edges of the sleeve 48 with plastic material. As one example of any number of ways in which this could be accomplished, the shoulder 66 near each of the evenly spaced tabs 70 could be configured to discontinue a short distance from the tabs 70 to cause the lower edge surface 64 of the sleeve 48 to be separated from any portion of the bottom core 58. With the major circumference of the lower edge surface 64 being separated from any portion of the bottom core 58, the molded plastic material will primarily surround and encase the major circumference of the lower edge surface 64. Such a configuration would still fall within the scope of the invention as claimed since the sleeve 48 would still include a generally radially extending surface which would be installed on a sleeve supporting surface of the valve body mold even though the supporting surface would be circumferentially smaller.

Still further, it should be clear that the sleeve 48 is simply one embodiment which could be utilized to practice the invention as claimed. Specifically, it would be possible for the reinforcing sleeve 48 to be made of some other material while still satisifying the basic criteria of reinforcing the body 14. Additionally, the sleeve need not be made to completely encircle the body 14 and could alternatively be made of some sheet material which could be formed to only partially encircle the body 14. For example, it might be desirable to form the reinforcing sleeve 48 from some sheet metal and simply roll the pre-formed sheet material to only at least partially surround the chamber 16 above and below the flow lines 18. In fact, with some other type of means for supporting a reinforcing sleeve means during an alternative method of forming the body, it would be possible for two separate partially encircling bands of metal to be installed within the interior of the body 14 to effectively prevent any circumferential expansion of the body 14 as might occur over an extended period of time at higher pressures. Although the figures do not show such upper and lower bands of reinforcing material separately in the valve 10, they are shown in the form of corresponding upper and lower parts of the preferred sleeve 48. Additionally, although it is clear from the cylindrical shape of the preferred body 14 that it would be appropriate for the sleeve 48 to have a cylindrical shape, some other type of shape could be provided if such shape would still reinforce a body of a similarly plastic valve. As a result, numerous alterations could clearly be made to the preferred embodiment described hereinabove without departing from the scope of the invention as claimed.

EMBODIMENT ILLUSTRATED IN FIGS. 7-18

Figure 7:
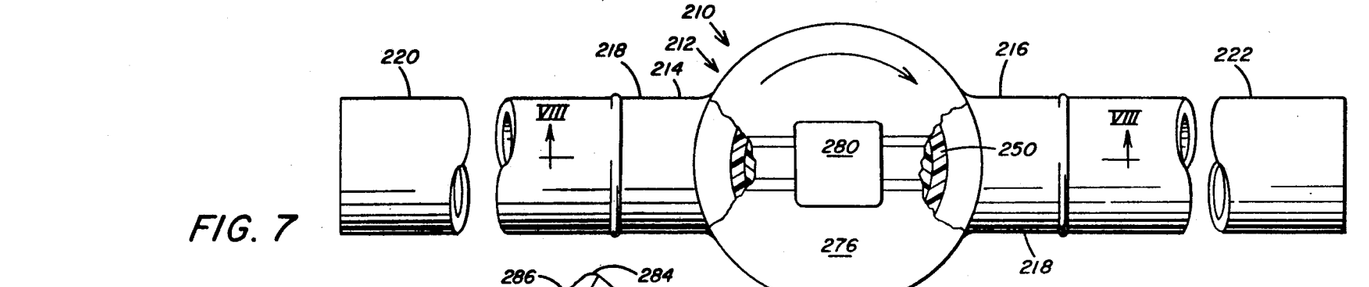
FIG. 7 is a top plan view of another embodiment of the valve with a cutaway portion showing the sleeve member and an arrow indicating the direction of rotation of the actuator.
Figure 8:
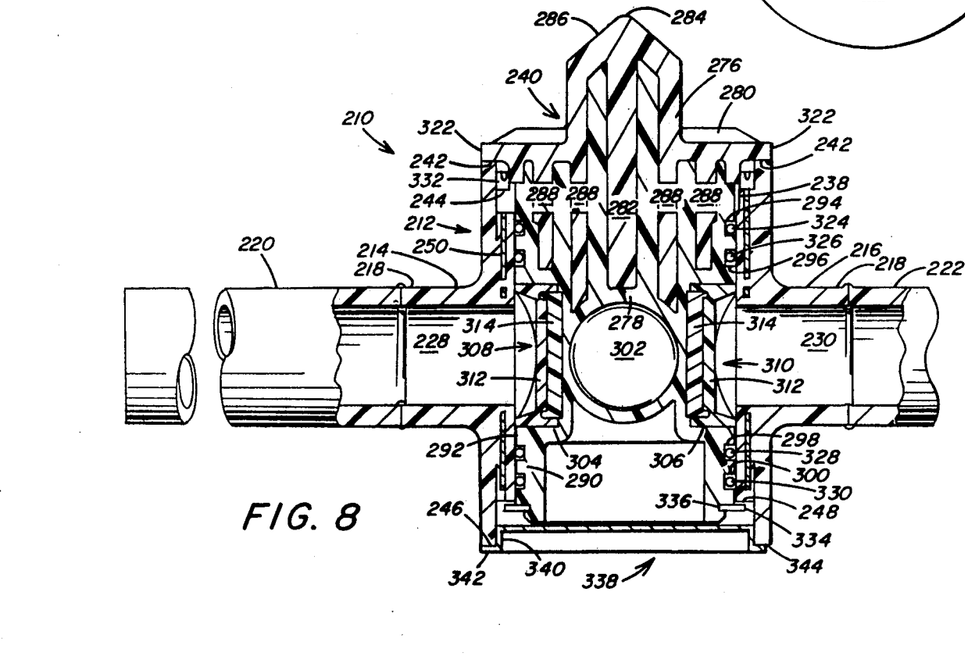
FIG. 8 is a view in section of the valve taken along lines 2—2 in FIG. 7.
Figures 11, 12, 13:
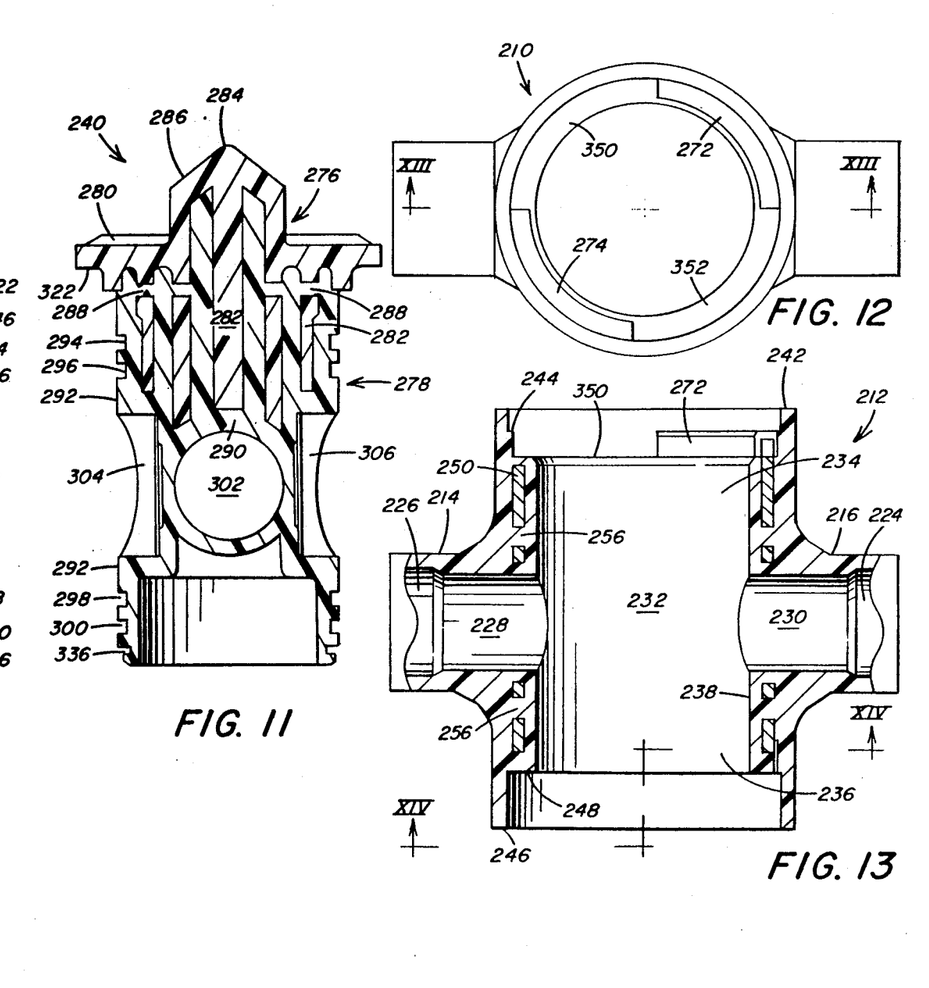
FIG. 11 is a view in side elevation and section of the plug illustrated in FIG. 10 rotated 90° illustrating the impact resistant plastic component of the plug.
FIG. 12 is a top plan view of the valve body illustrating the stop mechanism formed by the sleeve.
FIG. 13 is a view in cross section of the body portion of the preferred valve taken along line 13—13 in FIG. 12.
Figure 14:
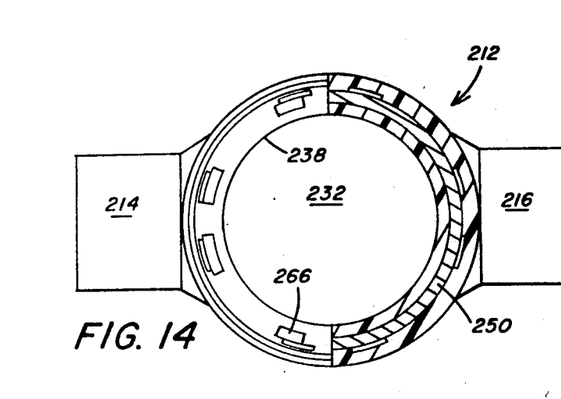
FIG. 14 is a top plan view partially in section of the valve body taken along line 8—8 in FIG. 13.
Figure 15:
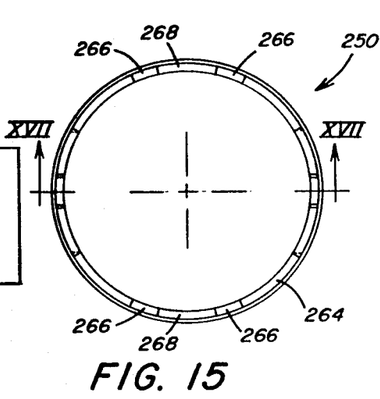
FIG. 15 is a bottom view of the sleeve.
Figure 16:
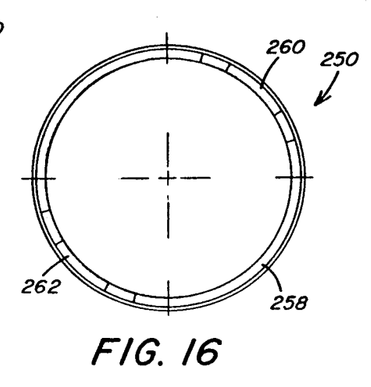
FIG. 16 is a top view of the sleeve showing the stop mechanism.

Referring to FIGS. 7 and 8, there is illustrated another embodiment of a reinforced plastic valve generally designated by the numeral 210. The valve 210 has a body portion 212 with a pair of flow lines 214 and 216 molded from polyethylene plastic. The flow lines 214 and 216 may have their end portions 218 fused to adjoining end portions of plastic pipes or conduits 220 and 222 as illustrated in FIGS. 7 and 8 or may be formed with enlarged end portions 224 as illustrated in FIG. 13 to receive a conduit therein. Preferably, the reinforced plastic valve 210 and the conduits 220 and 222 are fabricated from the same polyethylene or plastic material. Thus, the reinforced plastic valve 210 is connected in a plastic pipeline of the same material as the pipeline so that the valve 210 may be connected thereto by fusing the ends 218 of the flow lines 214 and 216 to the respective portions 220 and 222 of the pipeline.

Referring to FIGS. 8 and 13, the valve body portion 212 has a generally cylindrical configuration with the flow lines 214 and 216 extending radially therefrom. The flow lines 214 and 216 have passages 228 and 230 which are connected with the body portion 212 internal cavity 232 so that when the valve 210 is in the open position, gas or other fluids can flow therethrough. When the valve 210 is in the closed position, the flow of gas is restricted. Thus, the valve 210 will control the flow of gas under pressure through the pipe line formed from the conduits 220 and 222.

Figure 10:
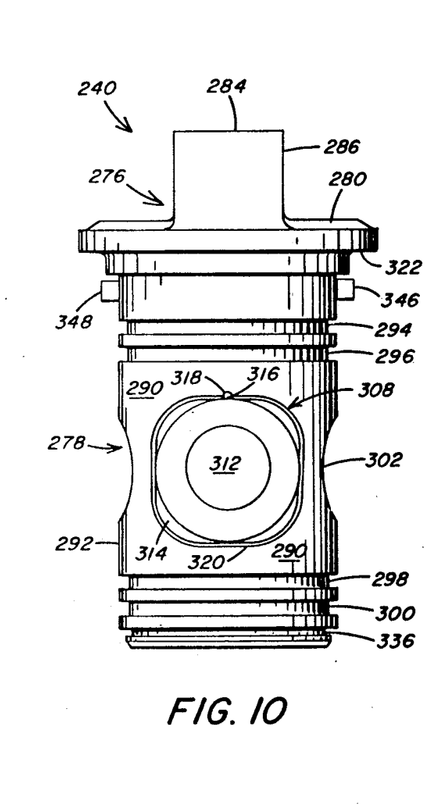
FIG. 10 is a view in side elevation of the valve actuator or plug illustrating in elevation the valve seat assembly.

The internal cavity 232 of the valve body portion 212 has a cylindrical inner wall 238 that is machined to close tolerances for receiving the plug or actuator generally designated by the numeral 240 and illustrated in detail in FIGS. 10 and 11. The internal cavity 232 has an upper portion 234 and a lower portion 236.

As shown in FIG. 13 the valve body portion 212 has an upper cylindrical edge portion 242 and an inturned shoulder portion 244 within the cavity 232. The valve body portion 212 has a bottom edge portion 246 and an inturned shoulder portion 248.

Figure 17:
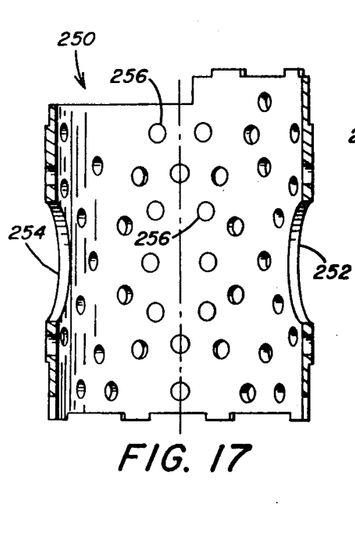
FIG. 17 is a view in the elevation and section of the sleeve taken along line 17—17 in FIG. 15 and illustrating the apertures, for the plastic to flow between the surfaces on either side of the sleeve.
Figure 18:
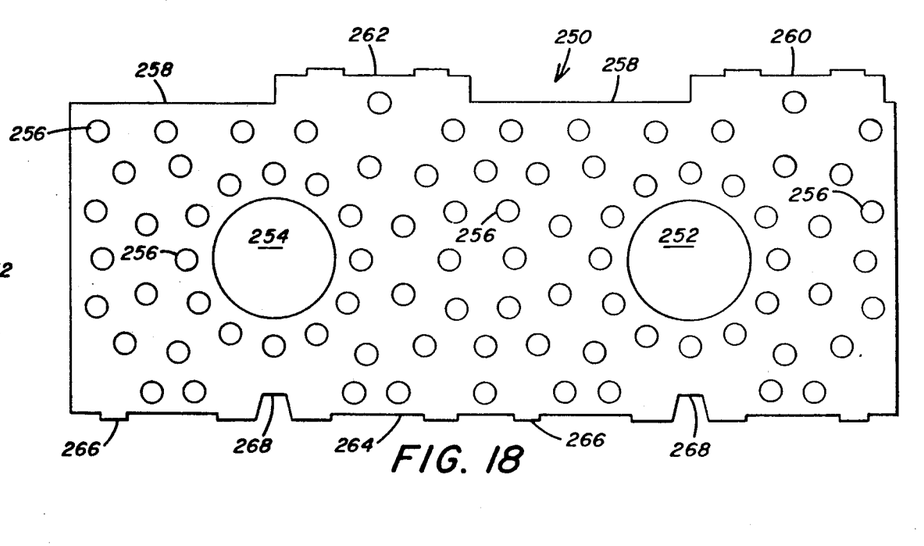
FIG. 18 is a layout view of the sleeve before it is rolled into a cylinder illustrating the configuration of the apertures in the sleeve.

A reinforcing member generally designated by the numeral 250 is illustrated in FIGS. 17 and 18. The reinforcing member 250 is formed from a material that has a higher dimensional stability than the polyethylene plastic material forming the valve body portion 212. The reinforcing member 250 can be fabricated from aluminum and has the configuration illustrated in FIG. 18 as it is stamped from an aluminum sheet. The reinforcing member 250 has a pair of apertures 252 and 254 which are aligned with the flow passages 228 and 230. The reinforcing member 250 has a plurality of other apertures 256 stamped therein which permit the flow of polyethylene plastic material through the apertures 256 to connect the plastic material on opposite sides of the metal reinforcing member 250. When plastic, such as polyethylene, is molded around a metal, there is no direct fusion between the polyethylene and the metal. The small apertures or passageways 256 between the two portions of plastic in the valve body 212 secure the metal reinforcing member 250 to the plastic in the valve body portion 212. The reinforcing member 250 has an upper edge portion 258 with a pair of upstanding stop portions 260 and 262. As later described, the stop portions 260 and 262 are arranged to limit the rotation of the actuator 240 to 90° of rotation and the stop portions 260 and 262 are also preferably encapsulated in the polyethylene plastic material forming the valve body portion 212. The metal reinforcing member 250 has a lower edge portion 264 with a plurality of tabs 266 extending downwardly therefrom and a pair of upwardly extending recesses 268 which serve as a locating mechanism for the metal reinforcing member sleeve 250 to properly align the sleeve 250 in the mold so that the sleeve 250 is oriented in the mold in one direction only.

The metal reinforcing member 250 is rolled into a cylindrical sleeve 250 and the edges are suitably secured as by a weld 270 (not shown). The sleeve 250 is positioned in a mold with the recessed portions 268 aligning the sleeve 250 so that the passageways 252 and 254 will be aligned with the flow passages 228 and 230 formed in the valve body 212.

Polyethylene is injected into the mold and the polyethylene takes on the configuration of the mold. The polyethylene flows through the openings 256 in the sleeve 250 to connect the polyethylene material to the metal reinforcing member 250. As previously stated, the metallic stop members 260 and 262 are encapsulated with the polyethylene to form valve body stop members designated by the numerals 272 and 274 formed in the plastic body portion 212. The plastic encapsulated stop members 272, 274 in the valve body 212 are illustrated in FIGS. 12 and 13.

With the metal reinforcing member 250 positioned within the body portion 212, the valve body portion 212 is provided with anti-creep resistance so that the valve body 212 will remain dimensionally stable when the valve cavity 232 is subjected to high pressures and, as later discussed, maintain a seal between the plug actuator 240 and the valve body cavity 232 internal wall 238. With the metal reinforcing member 250, the valve body 212 remains dimensionally stable and the plastic in the valve body 212 does not creep during periods of extended pressure within the valve cavity 232. Thus, it is now possible to provide a plastic valve 210 with anti-creep properties so that the valve 210 functions in a manner similar to valve bodies fabricated from a metal such as a cast iron. It is also possible to now accurately machine the inner wall 238 of the internal valve body cavity 232 to provide accurate tolerances for the seals, later discussed, and to maintain the seals in proper sealing relation while the valve is subjected to high pressures, as for example pressures of up to 300 psi. It has been found that the metal reinforced valve body 212 provides support at higher pressures and prevents unacceptable deformations under high pressure, as for example 300 psi, during long-term tests exceeding 1000 hours. In a fail-safe test where the valve 210 is subjected to a pressure of 600 psi, the valve body 212 is pushed away from the seals by the pressure and it has been found that the valve 210 will remain operable and maintain the desired sealing relation at this high pressure and that failures will occur first in the pipes 220, 222 connected to the valve 210 rather than to the valve 210 per se.

Figure 9:
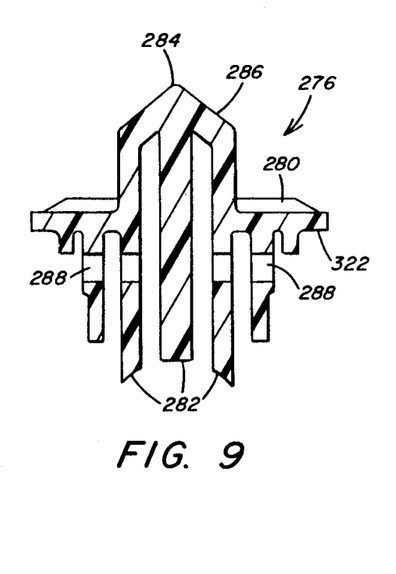
FIG. 9 is a view in section of the preformed impact resistant plastic actuator portion of the valve member and illustrating the apertures in the actuator portion depending legs.

Plug-actuator assembly 240 is illustrated in FIGS. 8, 10 and 11. The plug-actuator assembly 240 is a two-piece assembly with an actuator generally designated by the numeral 276 and a plug generally designated by the numeral 278. The actuator 276 has a body portion 280 with a plurality of depending legs 282 which are spaced from each other and have a generally circular configuration as shown in FIG. 9. Extending upwardly from the body portion 280 is an actuator nut 284 with sloping side walls 286 which minimize and reduces damage to the valve actuator 276 by the positioning of a wrench on the actuator 276. The depending legs 282 of actuator 276 have aligned apertures 288 through at least two of the legs 282.

Where desired, a similar aperture 288 can be formed through the central depending leg 282 and a pin can extend through the apertures 288 and similar apertures in the upstanding legs of the plug 278 to secure the actuator 276 to the plug 278.

The actuator 276 is molded from a plastic material resistant to impact and the plug 278 is formed of a plastic material which is dimensionally rigid and resistant to creep.

A suitable plastic material for the plug 278 is a nylon material sold under the trademark ZYTEL 80G/33 6/6 nylon by Dupont Company, Wilmington, Del. and a suitable plastic material for the actuator 276 is a rigid plastic such as the plastic material sold by General Electric, New York, N.Y. under the trademark XENOY6620.

The actuator 276 is separately molded and is then positioned in a mold where the plug 278 is formed by injection molding and is molded onto the actuator 276. With the apertures 288 in the depending legs 282 of actuator 276 during the injection molding of the plug 278, the dimensionally rigid plastic forming the plug 278 will flow into the apertures 288 to connect the actuator 276 to the plug 278. Thus, the actuator 276 may either be pinned to the plug 278 or secured thereto by the plastic flowing through the apertures 288 during the injection molding of the plug 278.

The plug 278 has a body portion 290 with a generally cylindrical outer surface 292. The outer cylindrical surface 292 is machined and dimensioned to fit within the cavity 232 of valve body 212 in abutting relation with the cylindrical inner wall 238 of cavity 212. The cylindrical surface 292 has a pair of upper O-ring grooves 294 and 296 and a pair of lower O-ring grooves 298 and 300. The O-ring grooves 294, 296, 298 and 300 are accurately machined into the cylindrical outer surface 292 and are arranged to receive O-rings as later discussed.

The valve plug 278 has a transverse passageway 302 therethrough which is arranged to be aligned with the passageways 228 and 230 in valve body 212 when the plug 278 is in an open position to permit the flow of fluid therethrough. The plug 278 has a pair of recessed valve seat receiving portions 304 and 306 which are on opposite sides of the passageway 302.

Referring to FIG. 8, valve seat assemblies 308 and 310 are positioned in the valve seat receiving portions 304 and 306. The valve seat assemblies 308 and 310 are similar in construction and have a valve seat member 312 and a disk-like support member 314. The support members 314 are positioned in the seat receiving portions 304, 306 to provide stability for the valve seat member 312. The valve support member 314 is aligned in the valve seat receiving portion 304, 306 by aligning a projection 316 extending from the valve support member 314 with a receiver 318 in the valve seat member 312. The valve seat member 312 is fabricated from a relatively soft material to provide better seating against the inner wall 238 of the valve body 212. The support member 314 is fabricated from a higher durometer material than the valve seat 312 and has a forwardly projecting annular ridge portion 320 which receives and supports the valve seat 312 within the valve seat recesses 304 and 306. This arrangement of a relatively soft valve seat 312 having a relatively rigid backup support disk 314 provides an assembly for the valve seats 308, 310 which has stability and has better tolerances for the valve seats 308, 310.

Referring to FIG. 8, the valve member 240 is positioned in the valve body cavity 232 with the body portion 280 of the actuator 276 having a circular flange 322 abutting the upper circular edge 242 of the valve body 212. O-rings 324 and 326 are positioned in the O-ring grooves 294 and 296 in the plug 278 and abut the inner surface or wall 238 of cavity 232 to seal the plug 278 in the valve body 212. There are lower O-rings 328 and 330 positioned in the O-ring grooves 298 and 300 to seal the opposite side of the valve seat assemblies 308, 310 in the valve body 212. An annular dirt seal 332 is positioned on the upper portion of the valve body 212 and abuts the shoulder portion 244 of the valve body 212 and the flange 322 of the actuator portion 276 of the valve plug assembly 240 The dirt seal 332 is circular in configuration and has an annular recessed portion to form a V-shaped seal in section as illustrated in FIG. 8. This configuration permits the seal 332 to expand when subjected to pressure from within the valve cavity 232 to permit seal 332 failure without destruction of the valve 210 components.

The plug and actuator assembly 276-278 is positioned within the cavity 232 and has a snap ring 334 positioned in an annular recess 336 in the valve plug portion 278. The snap ring 334 has a circular dimension greater than that of the valve body lower shoulder 248 to thus retain the valve plug and actuator 276–278 within the valve body cavity 232.

A circular cap 338 fabricated from a plastic material is positioned in the lower portion 236 of the valve body cavity 232 to seal the valve body cavity 232. The circular cap 338 has an upstanding annular shoulder 340 and a circular flange 342 upstanding therefrom. The flange 342 of the cap 338 is lightly fused to the annular bottom edge 246 of valve body 212 to provide a tamperproof valve 210. The outer edge of the annular shoulder 334 is fused to the lower end of the inner wall of the valve body 212 adjacent the annular bottom edge. The valve 210, however, is repairable in that one can remove the fused joint 344 between the cap 338 and the valve body 212 and by removing the snap ring 334, the actuator 276 and valve plug 278 can be removed from the valve body cavity 232 to replace the O-rings 324–330 and where necessary, replace the valve seats 312. The cap 338 is designed to release pressure accumulating in the chamber formed between the lower O-rings 328, 330 the cap 338 and the plug 278 due to leakage from the lower O-rings 328, 330 of fluids. The leakage of the cap 338 due to pressure in the valve 210 below the lower O-rings 328, 330 prevents the actuator-plug assembly 240 from being pushed upwardly and out of the valve body cavity 232 of the valve 210. The relatively slight leakage from the cap 338 indicates leakage at O-rings 328, 330 and appropriate repairs on valve 210 may then be implemented.

The valve seats 312 are dimensioned to have a dimension larger than the diameter of the passageways 228, 230 in the valve body 212 and also larger than the diameter of the pipes 220 and 222 to which the valve 210 is connected. Thus, if there is a failure of the valve seats 312, the valve seats 312 will remain within the valve body cavity 232 and can be repaired and replaced as above discussed.

The actuator 276 has a pair of stop members 346 and 348 as illustrated in FIG. 10. The stop members 346 and 348 are fabricated from the same plastic material as the plug 278 and are arranged to ride on shoulders 350 and 352 of the valve body 212 as shown in FIGS. 12 and 13. The stop members 346 and 348 provide a limit for the position of the plug 278 from an open position where the passageway 302 in plug 278 is aligned with the passageways 228 and 230 in the valve body 212 to a position 90° where the valve seat assemblies 308 and 310 are in overlying relation with the openings to the respective passageways 228 and 230. The stop members 346, 348 are formed of the same plastic material as the plug 278 and are designed to shear in the event of an override situation where the actuator 276 is turned with such a force that the plastic stops 346 and 348 are sheared from the plug 278. The stops 346, 348 that are sheared from the plug 278 are loose and remain within the valve 210 and do not obstruct the operation of the valve 210. When the stops 346, 348 are sheared, the valve 210 continues to operate normally with the exception that the plug 278 does not stop after 90° of rotation. The valve 210 after the stops 346 and 348 are sheared has a 360° rotation; however the operation of the valve 210 and its safety are not hindered by the shearing of the stops 346 and 348. The stops 346 and 348 are sheared by the metallic portions 260 and 262 of the metal reinforcing member 250.

According to the provisions of the patent statute, we have explained the principle, preferred construction and mode of operation of our invention and have illustrated and described what we now consider to represent its best embodiment. However, it should be understood that, within the scope of the appended claims, the invention may be practiced otherwise than as specifically illustrated and described.

We claim:

1. A reinforced plastic valve comprising, a valve body molded of plastic material and having a means for reinforcing said valve body, said valve body having a cylindrical bore with an upper portion and a lower portion, said upper portion and said lower portion both having a cylindrical edge, said lower portion of said cylindrical bore having a fluid inlet opening and fluid outlet opening, a valve plug and actuator assembly having a plug portion positioned in the lower portion of said chamber between said inlet opening and said outlet opening, said plug and actuator assembly having means thereon to control the flow of fluids through said chamber, said plug and actuator assembly being molded from plastic materials to form a unitary body including a plug portion and an actuator portion, said plug portion molded from a plastic material having high dimensional stability, and said actuator portion molded from a plastic material having high impact resistance, said plug portion having a flow passage therethrough, said plug portion being rotatable in said chamber between an opened position with said flow passage aligned with said inlet opening and said outlet opening and a closed position where said flow passage is not aligned with said inlet opening and said outlet opening to control the flow of fluid through said chamber lower portion, said actuator portion extending upwardly from said plug portion through said chamber upper portion, said actuator portion having a circular flange and an upwardly extending stem, said circular flange positioned in overlying relation with said valve body upper portion cylindrical edge and thereby closing said valve body chamber upper portion, said plastic valve body having a plastic disk-like closure member closing said valve body cylindrical bore lower portion, said plastic closure member being fused to said valve body cylindrical bore lower portion cylindrical edge so that when said fluid pressure within said valve body exceeds a preselected pressure a portion of said plastic closure member disengages from said valve body to release the fluid pressure from said chamber.

2. A reinforced plastic valve as set forth in claim 1 in which, said disk-like closure member having a cup-shaped configuration with an upstanding angular shoulder and a circular flange extending therefrom, said circular flange having a surface fused to said valve body lower portion cylindrical edge.

3. The reinforced plastic valve as set forth in claim 1 in which, said actuator portion of said plug and actuator assembly having circumferential projections extending into said plug portion of said plug and actuator assembly.

4. Said reinforced plastic valve as set forth in claim 3 in which, said circumferential projections on said actuator portion of said valve member having apertures to permit plastic injected into a mold to form said plug to flow through said apertures and form a unitary plug-actuator assembly.

* * * * *